(12) United States Patent
Gacoin et al.

(10) Patent No.: US 10,288,907 B2
(45) Date of Patent: May 14, 2019

(54) MOULD AND PROCESS FOR MANUFACTURING AN OPHTHALMIC LENS EQUIPPED WITH AN INSERT

(71) Applicant: Essilor International, Charenton-le-Pont (FR)

(72) Inventors: Eric Gacoin, Charenton-le-Pont (FR); Chefik Habassi, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 92 days.

(21) Appl. No.: 15/126,221

(22) PCT Filed: Mar. 16, 2015

(86) PCT No.: PCT/EP2015/055432
§ 371 (c)(1),
(2) Date: Sep. 14, 2016

(87) PCT Pub. No.: WO2015/140104
PCT Pub. Date: Sep. 24, 2015

(65) Prior Publication Data
US 2017/0102561 A1    Apr. 13, 2017

(30) Foreign Application Priority Data
Mar. 18, 2014   (EP) .................................... 14305377

(51) Int. Cl.
*B29C 45/14*    (2006.01)
*B29D 11/00*    (2006.01)
(Continued)

(52) U.S. Cl.
CPC ........ *G02C 11/10* (2013.01); *B29C 45/14065* (2013.01); *B29D 11/00009* (2013.01);
(Continued)

(58) Field of Classification Search
CPC .... B29C 45/14065; B29C 2045/14139; B29C 2045/14122; B29C 2045/0086; B29D 11/00692; B29D 11/00009
See application file for complete search history.

(56) References Cited

U.S. PATENT DOCUMENTS

| | | | |
|---|---|---|---|
| 4,190,621 A * | 2/1980 | Greshes | ........... B29D 11/00028 264/1.8 |
| 4,795,667 A | 1/1989 | Armstrong | |

(Continued)

FOREIGN PATENT DOCUMENTS

| | | |
|---|---|---|
| CN | 1821814 A | 8/2006 |
| CN | 102958684 A | 3/2013 |

(Continued)

OTHER PUBLICATIONS

Office Action issued in corresponding Chinese patent application No. 201580009974.9; dated Dec. 8, 2017.
(Continued)

*Primary Examiner* — Robert B Davis
(74) *Attorney, Agent, or Firm* — Oblon, McClelland, Maier & Neustadt, L.L.P.

(57) ABSTRACT

The invention relates to a mold (2) for manufacturing an ophthalmic lens or an ophthalmic lens blank called a puck (3), equipped with an insert (1), said mold comprising a first portion (2A) intended to mold the front face of the ophthalmic lens or puck, a second portion (2B) intended to mold the back face of the ophthalmic lens or puck and at least one third portion (2C) intended to mold a peripheral lateral face of the ophthalmic lens or puck. According to the invention, said mold (2) comprises at least one recess (2B1, 2B2, 2B3, 2B4) for positioning the insert (1), before and during the molding.

8 Claims, 7 Drawing Sheets

(51) Int. Cl.
  *G02C 11/00* (2006.01)
  *G02B 27/01* (2006.01)
  *F21V 8/00* (2006.01)
  G02C 7/08 (2006.01)
  B29C 45/00 (2006.01)

(52) U.S. Cl.
  CPC ...... *B29D 11/00692* (2013.01); *G02B 6/0001* (2013.01); *G02B 27/017* (2013.01); *G02B 27/0172* (2013.01); *B29C 2045/0086* (2013.01); *B29C 2045/14139* (2013.01); *G02B 2027/0178* (2013.01); *G02C 7/086* (2013.01)

(56) References Cited

U.S. PATENT DOCUMENTS

| | | |
|---|---|---|
| 5,069,852 A | 12/1991 | Massimo et al. |
| 2013/0069260 A1* | 3/2013 | Buchon ............ B29D 11/00663 264/1.7 |

FOREIGN PATENT DOCUMENTS

| | | |
|---|---|---|
| EP | 1792224 | 9/2011 |
| EP | 2418073 A1 | 2/2012 |
| GB | 579752 | 8/1946 |
| WO | 2011095379 | 8/2011 |
| WO | 2012004089 A1 | 1/2012 |
| WO | 2012004090 A1 | 1/2012 |

OTHER PUBLICATIONS

Office Action dated Jan. 12, 2019, in Israel Patent Application No. 247069. (2 pgs.).

* cited by examiner

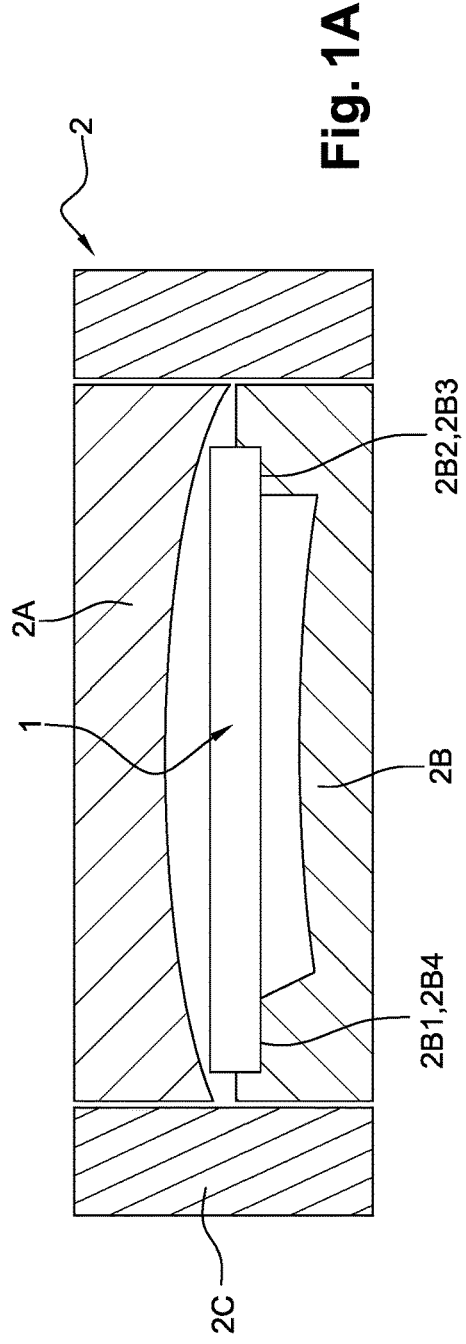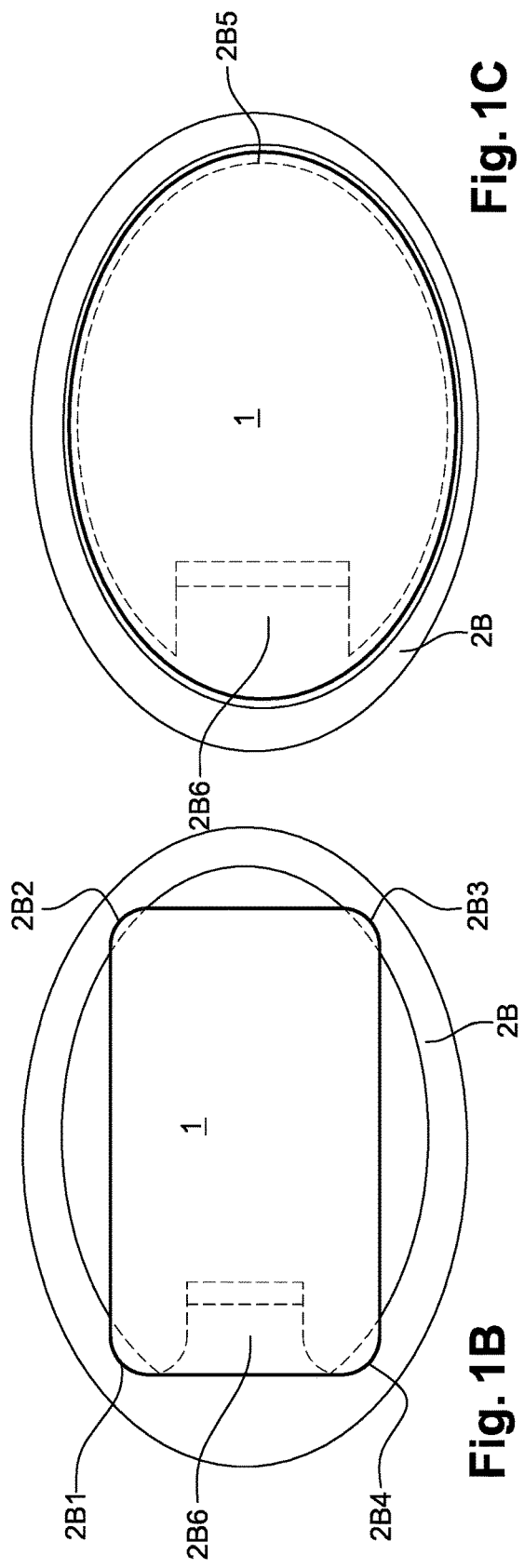

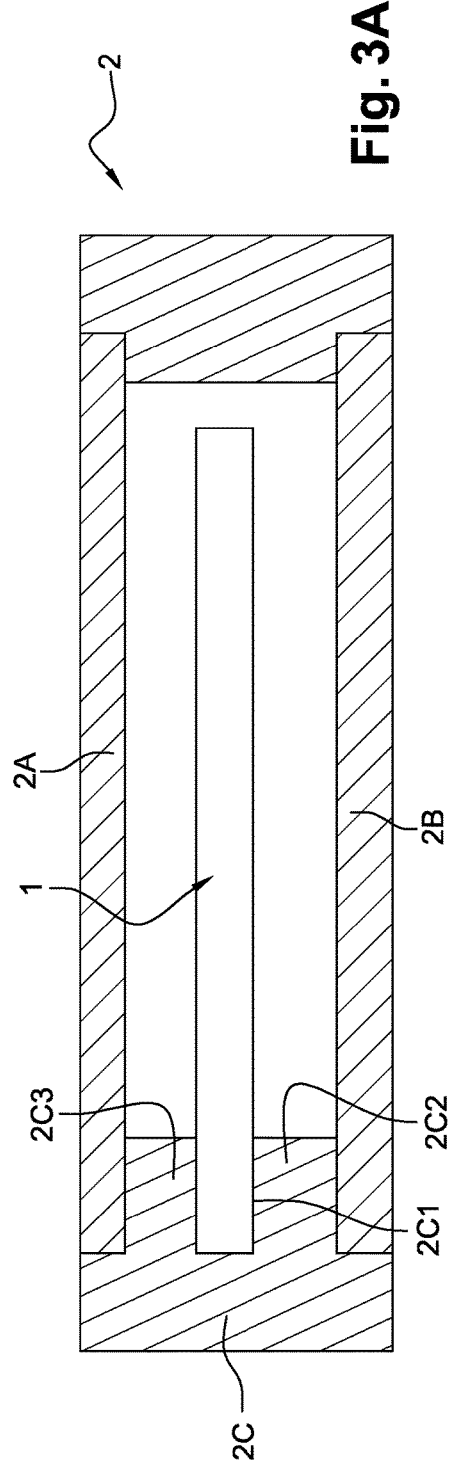
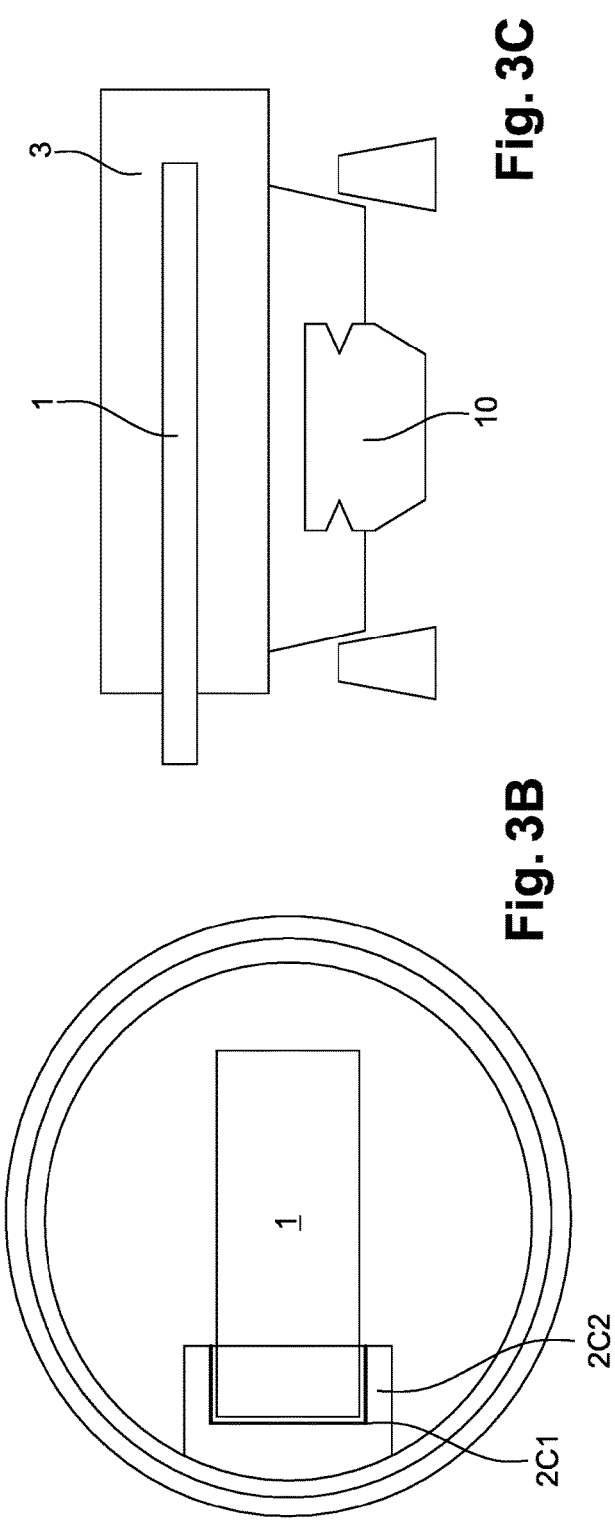
Fig. 3A
Fig. 3B
Fig. 3C

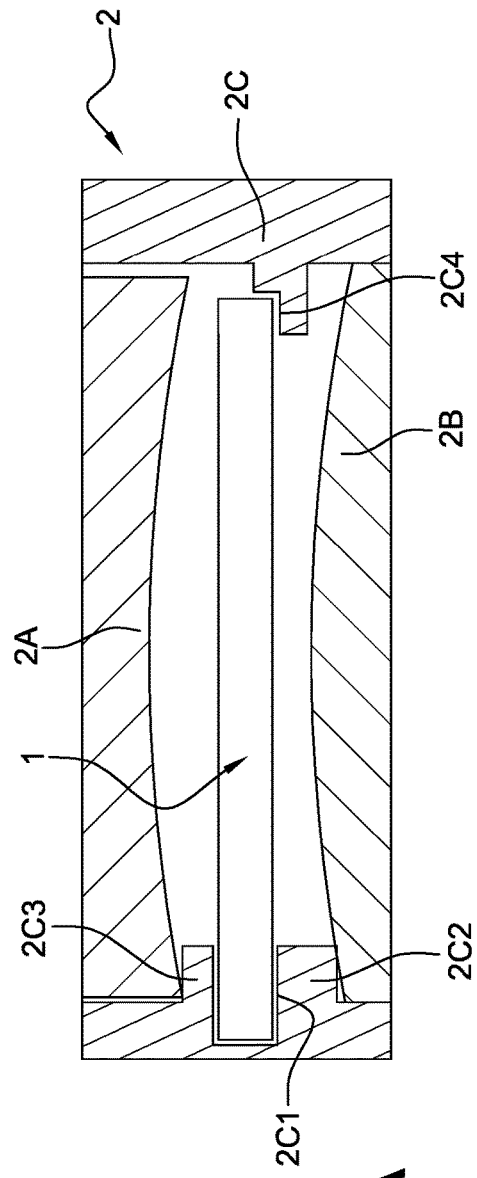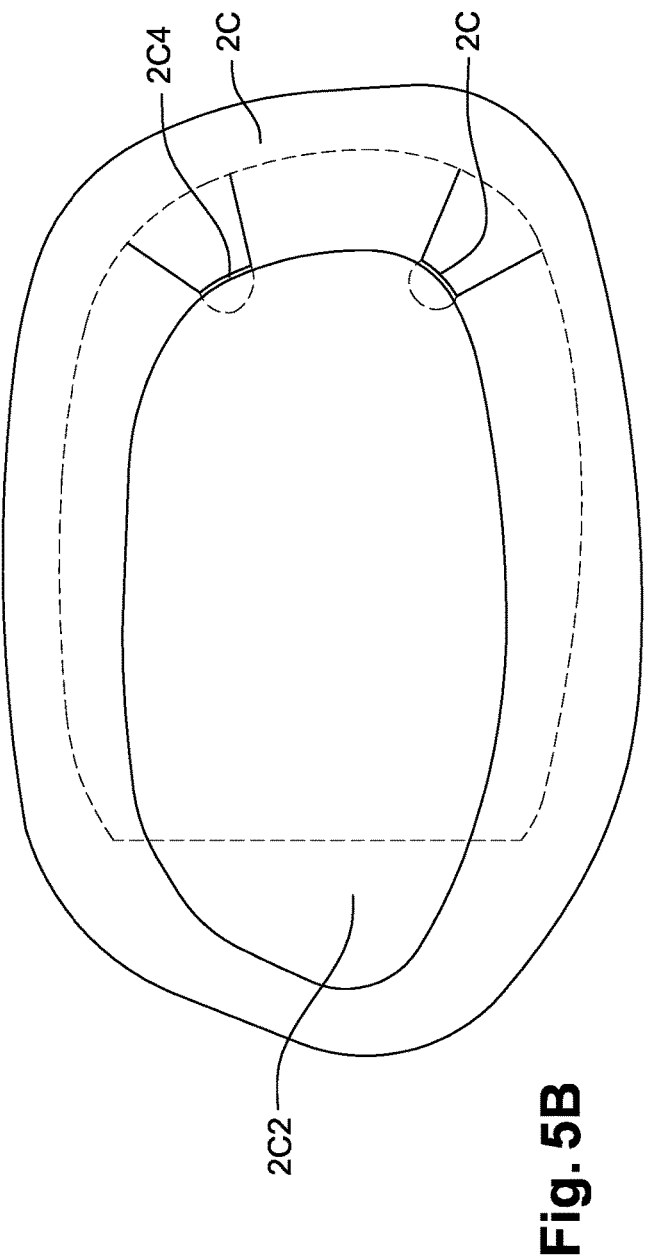

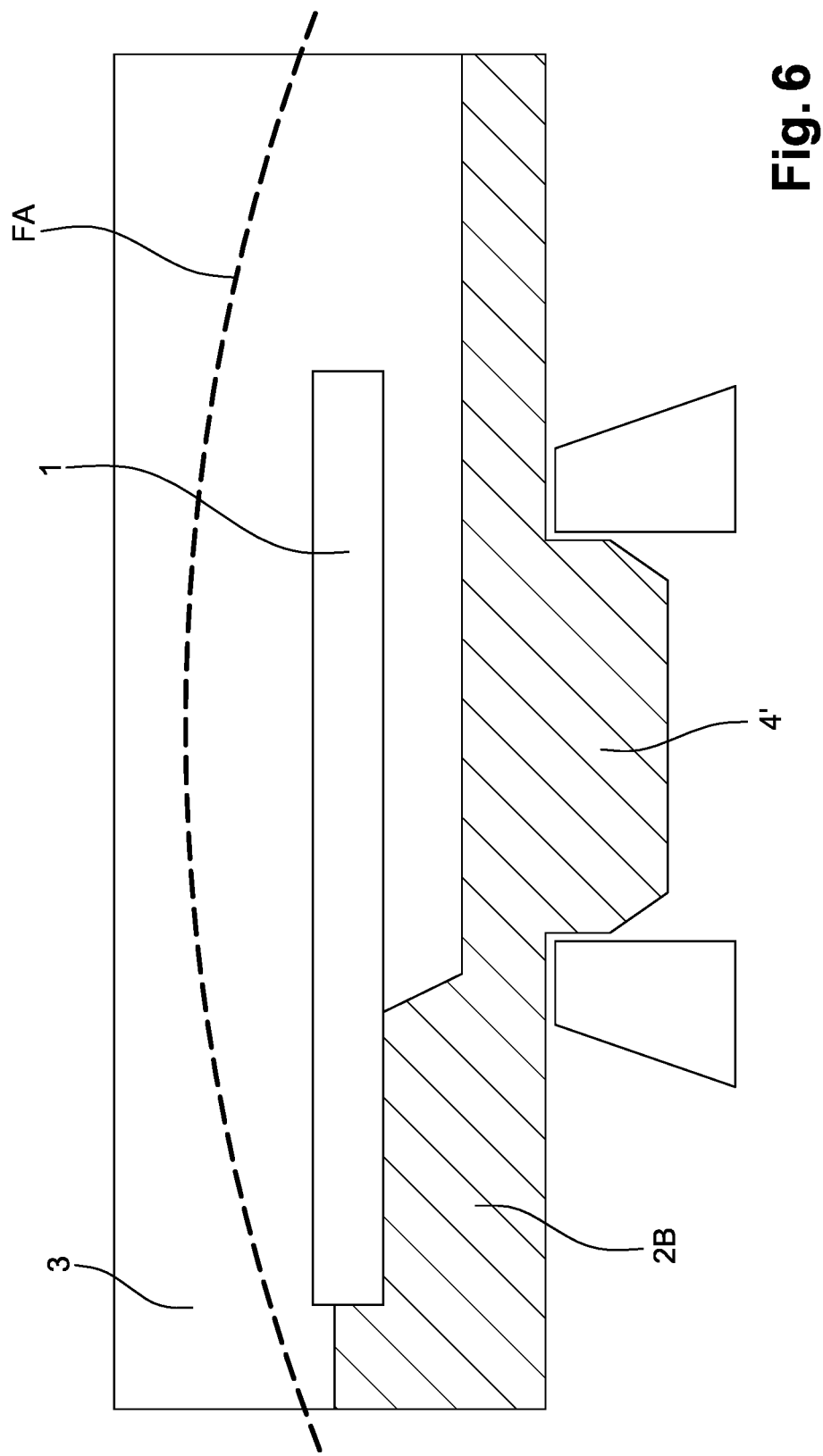

MOULD AND PROCESS FOR MANUFACTURING AN OPHTHALMIC LENS EQUIPPED WITH AN INSERT

The invention relates to a mould and process for manufacturing an ophthalmic lens for a pair of spectacles, said lens being equipped with an insert.

It in particular relates to a lens intended to be used as an optical display, the insert being a waveguide intended to receive optical beams via an entrance surface and to guide said beams towards the eye of the wearer so as to create an informative image.

A process for manufacturing such a lens is described in patent EP 1 792 224, in which the lens is directly moulded, and in patent document WO 2011/095379, in which a lens blank called a "puck" is molded and then processed by machining and polishing at least one of its faces in order to form the front or back face of the lens.

In these documents, the mould comprises a first mould portion intended to mould the front face of the lens or puck, and a second mould portion intended to mould the back face of the lens or puck. A pad joined to the second portion of the mould is, on the one hand, intended to form a moulded cavity, in order to produce the free surface through which the optical beams enter into the waveguide, and on the other hand, used to receive the waveguide before the molding. To do this, the waveguide is temporarily fastened to the pad before the moulding, preferably by adhesive bonding by means of a monomer layer.

This being so, such a process requires the waveguide to be adhesively bonded to the pad with a high positional precision since it is essential for the waveguide to be correctly positioned inside the mould and therefore inside the moulded puck or lens. This is a particularly difficult operation that requires an optical alignment.

Specifically, the precise three-dimensional position of the waveguide in the finished lens is of utmost importance. The assembly must meet precise optical specifications, both with respect to real vision (formation on the eye of an image borne by light passing through both faces of the glass) and with respect to the informative display (formation on the eye of an image transported by the waveguide). It is also necessary to minimize component volumes, in order to obtain a lens that is light and thin. The lens must also meet aesthetic criteria.

Lastly, when a puck is produced at least one of the faces of which is intended to be machined then polished after the puck has been demoulded, it is of utmost importance that the integrity of the waveguide not be compromised when said face of the puck is machined and polished to form the front and/or back faces of the lens. More precisely, a poorly positioned waveguide may cause the tool to collide with the waveguide and it to break during the machining of the front and/or back face of the puck, or even when the lens is trimmed to give it a shape corresponding to that of the frame in which it must be fitted.

It turns out that mass production is therefore impossible with such a process.

The invention solves these problems by providing a mould and a process for manufacturing a lens or a lens blank or puck that ensures the insert is located in a very precise position in the ophthalmic lens, while remaining relatively simple and therefore inexpensive to produce/carry out.

To do this, the invention provides a mould for manufacturing an ophthalmic lens or an ophthalmic lens blank called a puck, equipped with an insert, said mould comprising a first portion intended to mould the front face of the ophthalmic lens or puck, a second portion intended to mould the back face of the ophthalmic lens or puck and at least one third portion intended to mould a peripheral lateral face of the ophthalmic lens or puck, characterized in that said mould comprises at least one recess for positioning the insert, before and during the moulding.

An ophthalmic lens is intended to be placed in front of an eye of a wearer in order to correct his vision, and/or protect the eye and/or attenuate the amplitude of the light arriving on the retina of the eye. The function of the ophthalmic lens may also be to protect the insert and/or to position it in front of the eye.

The insert may be any element inserted into the lens for which the position in the latter is critical with regard to optical constraints or to meeting thickness specifications or to avoiding the risk of breakage. By way of example, it may be an optical waveguide such as mentioned above, or a polarizing film or an active Fresnel module, an electrochromic module, a photochromic module, a fluidic module or a scattering module.

The term "recess" may here mean a locating hole, a slot, an insertional portion, a housing, a base, a notch, a void, a groove, a trench, a slit or a shoulder for example.

According to a first preferred embodiment, said recess is arranged on the first portion of said mould.

According to a second preferred embodiment, said recess is arranged on the second portion of said mould.

According to a third preferred embodiment, said recess is arranged on the third portion of said mould.

According to a fourth preferred embodiment, said recess is arranged in a part insertable into the third portion of said mould.

The invention also relates to a process for manufacturing an ophthalmic lens or an ophthalmic lens blank called a puck equipped with an insert by means of such a mould, said recess of which is obtained by assembling at least two different portions of said mould.

The invention also relates to a process for manufacturing an ophthalmic lens or an ophthalmic lens blank called a puck equipped with an insert by means of such a mould, the insert of which is positioned by gravity.

The invention also relates to a process for manufacturing an ophthalmic lens or an ophthalmic lens blank called a puck equipped with an insert by means of such a mould, and for which the insert is inserted via one of its edges into said recess.

The invention relates to an ophthalmic lens or ophthalmic lens blank called a puck intended to be used as an optical display and being manufactured by means of such a mould, said ophthalmic lens being intended to be placed in front of one eye of a wearer, the insert being an optical waveguide element intended to receive optical beams via an entrance surface formed/located on said flush edge of the insert and to guide said optical beams toward the eye of the wearer so as to create an informative image on said eye.

Lastly, the invention relates to an ophthalmic lens manufactured by means of such a mould, the insert being a controllable optical module.

The invention is described in greater detail below by way of the figures, which show only preferred variant embodiments of the invention.

FIGS. 1A to 1C are cross-sectional and top views of a first variant embodiment of the invention.

FIGS. 3A to 3C are cross-sectional and top views of a third variant embodiment of the invention.

FIGS. 5A to 5B are cross-sectional and top views of a fifth variant embodiment of the invention.

FIG. 6 is a cross-sectional view of a sixth variant embodiment of the invention.

Figure 2:
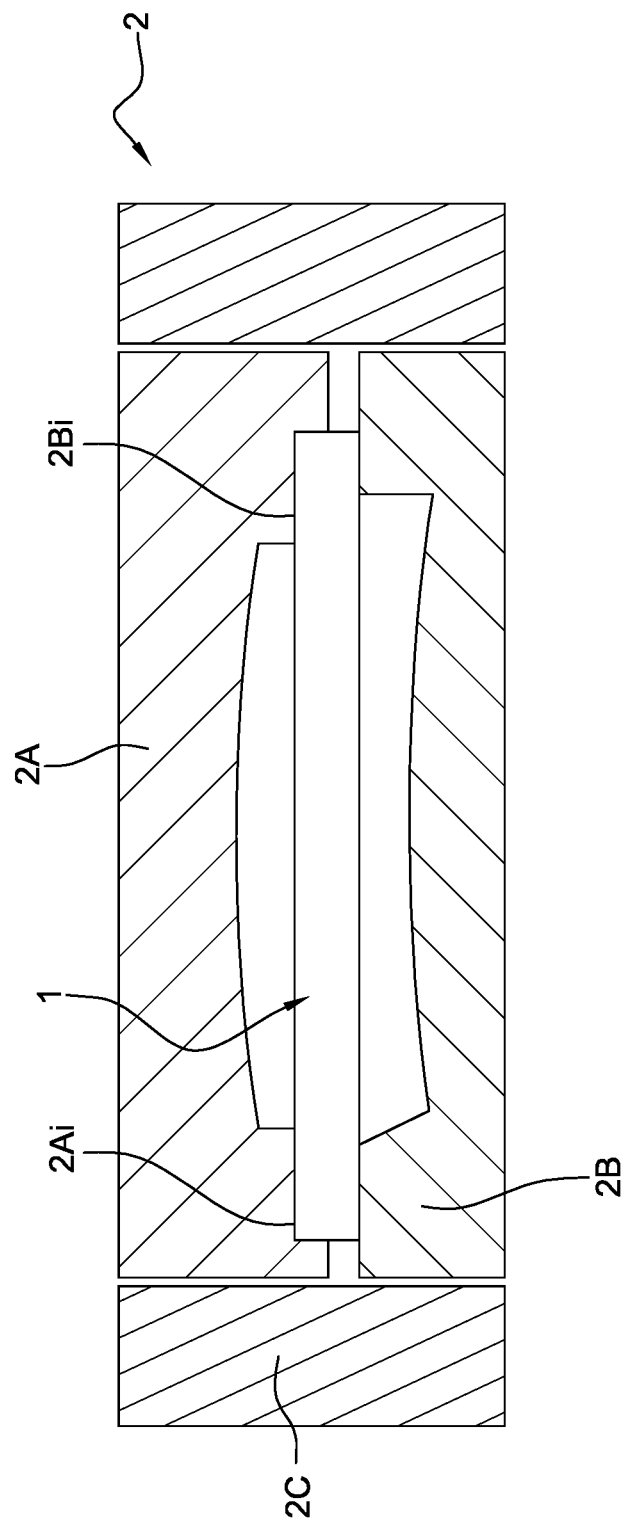
FIG. 2 is a cross-sectional view of a second variant embodiment of the invention.

The invention relates to a mould 2 for manufacturing an ophthalmic lens or an ophthalmic lens blank called a puck 3, equipped with an insert 1, the mould comprising a first mould portion 2A intended to mould the front face of the ophthalmic lens or puck, a second mould portion 2B intended to mould the back face of the ophthalmic lens or puck and at least one third mould portion 2C intended to mould a peripheral lateral face of the ophthalmic lens or puck.

According to the invention, generally, the mould 2 comprises at least one recess for positioning the insert 1, before and during the moulding.

Although specifically described below and shown in the figures for the case where the insert 1 is a waveguide intended to receive optical beams via an entrance surface located on a flush edge of the insert and to guide said optical beams toward the eye of the wearer so as to create an informative image on the eye, the ophthalmic lens being intended to be used as an optical display and being intended to be placed in front of one eye of a wearer to correct his vision, the process may apply to any element inserted into the lens for which the position in the latter is critical with regard to optical constraints or to meeting thickness specifications or to avoiding the risk of breakage. As specified above, the insert may also be a controllable optical module, such as an active Fresnel module, an electrochromic module, a photochromic module, a fluidic module or a scattering module.

According to a first variant embodiment shown in FIGS. 1A to 1C, the recess is arranged in the second portion 2B of the mould and the mould 2 is shaped to mould an ophthalmic lens.

According to a first possibility, shown from above in FIG. 1B, the insert 1 has frontal shape that is substantially rectangular with rounded corners and it is these corners that are positioned by gravity in four recesses 2B1 to 2B4 arranged in the second portion 2B of the mould.

According to a second possibility, shown from above in FIG. 1C, the insert 1 has frontal shape that is substantially oval and it is its complete lateral edge that is positioned by gravity in a continuous peripheral recess 2B5 arranged in the second portion 2B of the mould.

Specifically, when the ophthalmic lens is intended to be fitted into a spectacle frame having a defined outline, preferably, the third mould portion 2C is configured to shape the peripheral lateral face of the ophthalmic lens or puck after moulding following said outline. According to this second possibility, the insert 1 has an outline the shape of which is deduced from the outline of said spectacle frame via a homothetic transformation of ratio lower than or equal to 1.

Furthermore, the recess may serve to replicate a shape on one portion of the ophthalmic lens that facilitates its fitting into the spectacle frame.

The function of facilitating the fitting of the ophthalmic lens into the frame may optionally be provided by a second recess of the mould.

In both these two cases, the second mould portion 2B comprises a moulding segment 2B6 that leaves flush one edge of the insert on the side of the back face of the ophthalmic lens and that is intended to leave free the entrance surface of the optical beams under the insert 1.

According to a second variant embodiment shown in FIG. 2, the one or more recesses 2Ai are arranged on the first portion 2A of the mould and the mould 2 is shaped to mould an ophthalmic lens, i.e. an assembly the faces of which have not been machined.

The insert 1 is then positioned by clamping and blocking different portions of the mould and various possibilities analogous to those described above may be envisioned as regards the form taken by the recess(es) and the insertion of the insert into the latter.

According to a third variant embodiment, shown in FIGS. 3A to 3C, the recess 2C1 is arranged on the third portion 2C of the mould, which is made up of a single peripheral seal-type portion, and the mould 2 is shaped to mould a puck or ophthalmic lens blank at least one of the faces of which is machined then polished after demoulding.

The insert 1, of rectangular frontal shape, is then inserted via one of its edges into this recess 2C1 and it is the third mould portion 2C that comprises a moulding segment 2C2 that leaves flush, after demoulding, one edge of the insert on the side of the back face of the ophthalmic lens and that is intended to leave free the entrance surface of the optical beams under the insert 1. Here, the third mould portion 2C also comprises a moulding segment 2C3 that leaves flush one edge of the insert on the side of that face of the puck from which the front face of the ophthalmic lens is produced.

Once moulded, as illustrated in FIG. 3C, the puck equipped with its insert 1 is machined on these frontal faces to form the front and back faces of the finished ophthalmic lens. To do this, the puck is fastened to a referential holding member 10, for example on its face opposite that which is machined.

Figure 4:
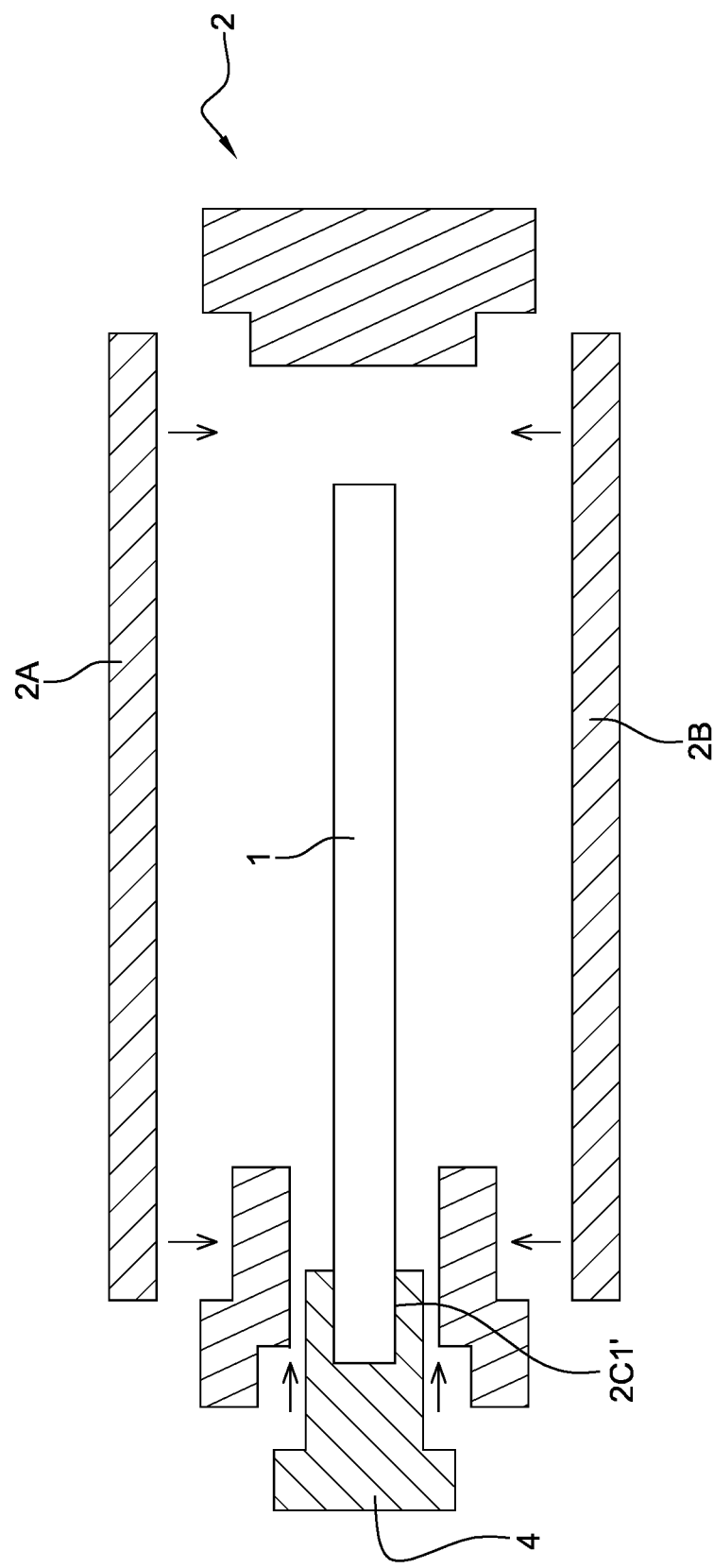
FIG. 4 is a cross-sectional view of a fourth variant embodiment of the invention.

According to a fourth variant embodiment, shown in FIG. 4, the recess 2C1' is arranged in a part 4 insertable into the third portion 2C of the mould and the insert 1 is inserted via one of its edges into this recess 2C1' as above. This arrangement makes it possible to facilitate assembly and disassembly of the mould after moulding.

According to a fifth variant embodiment shown in FIGS. 5A and 5B, the recess is arranged in the third portion 2C of the mould and the mould 2 is shaped to mould an ophthalmic lens.

Since this ophthalmic lens is intended to be fitted into a spectacle frame having a defined outline, this third mould portion 2C is configured to shape the peripheral lateral face of the ophthalmic lens after moulding following said outline. The insert 1 for its part has an outline the shape of which is deduced from the outline of the spectacle frame via a homothetic transformation of ratio lower than or equal to 1.

The insert 1 is inserted via one of its edges into a recess 2C1 and it is the third mould portion 2C that comprises a moulding segment 2C2 that leaves flush, after demoulding, one edge of the insert on the side of the back face of the ophthalmic lens and that is intended to leave free the entrance surface of the optical beams under the insert 1. Here, the third mould portion 2C also comprises a moulding segment 2C3 that leaves flush, after demoulding, one edge of the insert on the side of the front face of the ophthalmic lens.

The insert 1 is also placed at its other end on two recesses 2C4 also borne by the third mould portion 2C, and on which it is positioned by gravity.

According to a sixth variant embodiment shown in FIG. 6, one portion of the mould, here the second mould portion 2B, may comprise a referential holding pad 4' for the machining of that face of the puck from which the front face FA of the ophthalmic lens is produced by machining. Once set, the puck 3 equipped with its insert 1 is left on the mould portion 2B and this front face FA is machined. To do this, the pad 4' is fastened to a referential holding member.

Figure 7:
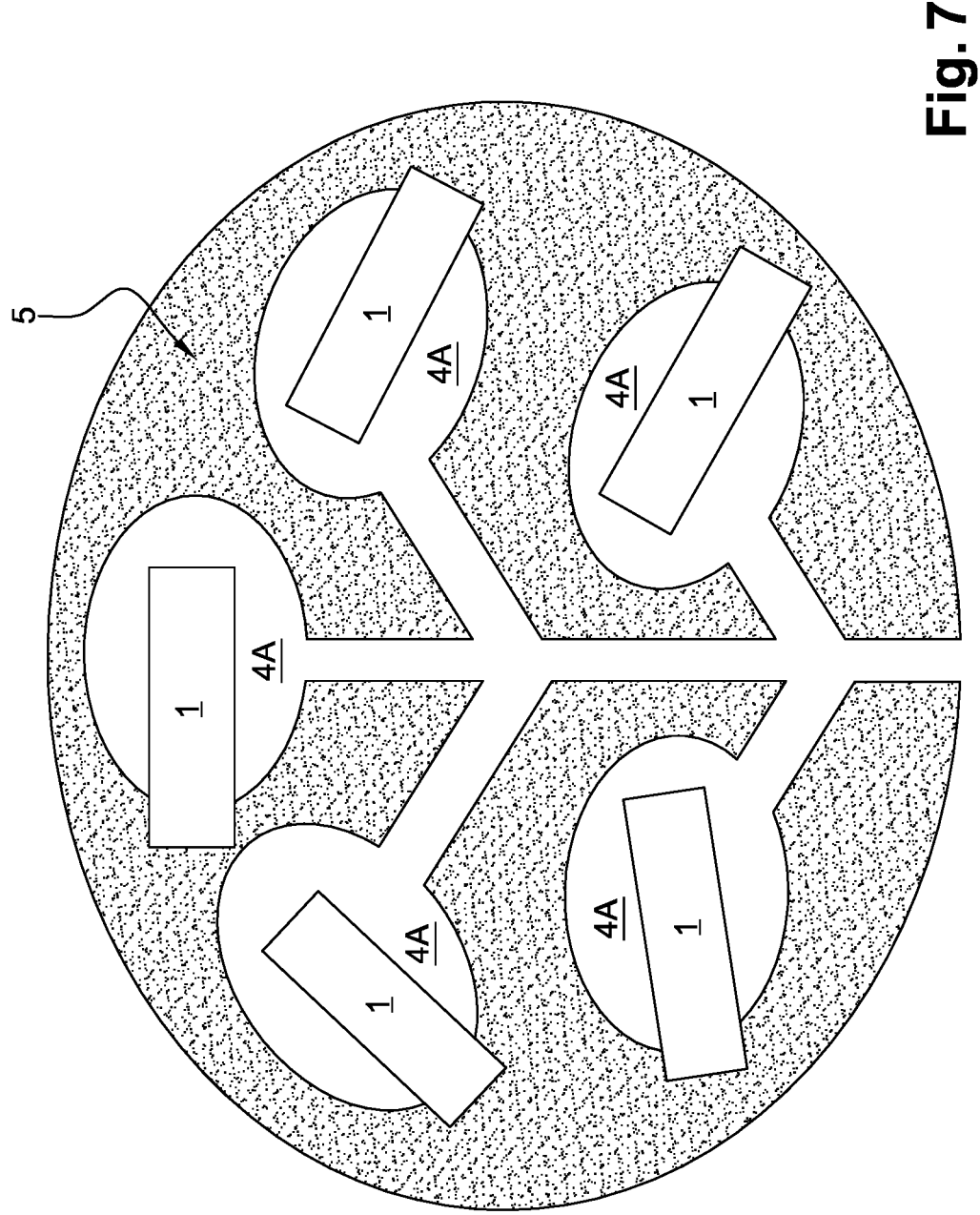
FIG. 7 is a partial top view of one variant embodiment of the invention particularly suitable for simultaneously manufacturing a large number of lenses or pucks.

According to one variant embodiment, shown in FIG. 7, a battery of moulds comprises a plate 5 containing a tree of supply ducts for filling each mould cavity 4A equipped with an insert 1 positioned in a recess.

The invention covers other variant embodiments that have not been precisely described above.

By way of example, the recess may be obtained by assembling at least two different portions of the mould 2, such as for example according to the variant illustrated in FIG. 4. According to another example, the recess may be inserted between two cup-shaped mould portions that are clamped together and each of which forms a frontal portion and a lateral peripheral portion.

In the various figures described above, the mould comprises a first portion intended to mould the front face of the ophthalmic lens, a second portion intended to mould the back face of the ophthalmic lens and at least one third portion intended to mould a peripheral lateral face of the ophthalmic lens or puck. It goes without saying that said first, second and third portions may be one, two or three separate parts.

The moulds schematically shown in FIGS. 1A to 1C, as in FIGS. 2, 3A to 3C and 4, 5A to 5B and 6, are intended to mould thermosetting resins, but they could also be adapted to processes for injection moulding thermoplastics.

In contrast, the battery of moulds shown in FIG. 7 is intended to mould thermoplastics, but it could also be adapted to processes for injection moulding thermosetting resins.

The invention claimed is:

1. A mould for manufacturing an ophthalmic lens or an ophthalmic lens blank (puck) equipped with an insert, said mould comprising:
   a first portion to mould a front face of the ophthalmic lens or puck,
   a second portion to mould a back face of the ophthalmic lens or puck, and
   at least one third portion to mould a peripheral lateral face of the ophthalmic lens or puck,
   wherein said mould includes at least one recess for positioning the insert, with abutment according at least two different directions, before and dining moulding.

2. The mould of claim 1, wherein the at least one recess comprises a recess that is arranged on the first portion of said mould.

3. The mould of claim 1, wherein the at least one recess comprises a recess that is arranged on the second portion of said mould.

4. The mould of claim 1, wherein the at least one recess comprises a recess that is arranged on the third portion of said mould.

5. The mould of claim 4, wherein said recess is arranged in a part insertable into the third portion of said mould.

6. The mould of claim 1, wherein said second mould portion or said third mould portion comprises a moulding segment leaving flush one edge of the insert on at least one side of the back face and front face of the ophthalmic lens or puck.

7. The mould of claim 1, wherein said ophthalmic lens is to be fitted into a spectacle frame having a defined outline, wherein said third portion is configured to shape said peripheral lateral face of the ophthalmic lens or puck after moulding following said outline.

8. The mould of claim 7, wherein said insert has an outline the shape of which is deduced from said outline of said spectacle frame via a homothetic transformation of ratio strictly lower than 1.

* * * * *